(12) United States Patent
King et al.

(10) Patent No.: US 10,928,805 B2
(45) Date of Patent: Feb. 23, 2021

(54) ADDITIVE MANUFACTURING SYSTEM AND METHOD HAVING TOOLPATH ANALYSIS

(71) Applicant: Lawrence Livermore National Security, LLC, Livermore, CA (US)

(72) Inventors: Michael J. King, Livermore, CA (US); Ryan A. Fellini, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 134 days.

(21) Appl. No.: 16/191,728

(22) Filed: Nov. 15, 2018

(65) Prior Publication Data
US 2020/0159186 A1    May 21, 2020

(51) Int. Cl.
*G05B 19/00*    (2006.01)
*G05B 19/4099*  (2006.01)
*G05B 19/402*   (2006.01)

(52) U.S. Cl.
CPC ....... *G05B 19/4099* (2013.01); *G05B 19/402* (2013.01); *G05B 2219/35101* (2013.01); *G05B 2219/49023* (2013.01)

(58) Field of Classification Search
None
See application file for complete search history.

(56) References Cited

U.S. PATENT DOCUMENTS

| | | | |
|---|---|---|---|
| 2016/0059489 A1* | 3/2016 | Wang | B29C 64/386 700/119 |
| 2018/0079138 A1* | 3/2018 | Tanaka | B29C 64/386 |
| 2018/0319087 A1* | 11/2018 | Eom | G06T 17/30 |

OTHER PUBLICATIONS

Bramptom et al. New Optimization Method for Steered Fiber Composites Using the Level Set Method. Struct Multidisc Optim, No. 52, 2015, pp. 493-505.

* cited by examiner

*Primary Examiner* — Paul B Yanchus, III
(74) *Attorney, Agent, or Firm* — Harness, Dickey & Pierce, P.L.C.

(57) ABSTRACT

An additive manufacturing (AM) system is disclosed for constructing a three dimensional (3D) part with optimized orthotropy. The system combines an electronic processor which calculates an optimal set of physically achievable toolpaths to meet a given design objective, and a 3D printing direct ink write machine capable of printing inks with reinforcing particles that result in orthotropic materials. The electronic processor may combine a Domain of Interest subsystem that transforms a mathematical description of a desired part orthotropy to a plurality of guidepaths, a toolpath generate subsystem that develops a plurality of physically realizable toolpaths from those guidepaths with a minimum number of starts and stops, a finite element subsystem that computes spatially varying material orthotropy from those toolpaths and then solves a boundary value problem to determine a figure of merit for the design, and an optimization subsystem that uses that figure of merit to update the mathematical description of the part orthotropy to iteratively develop an improved part. The optimization subsystem also includes convergence criteria to indicate when toolpaths have been achieved that yield a sufficiently optimal part has been achieved. The toolpath generate can then output the final toolpaths, which are converted to suitable code that controls the motion of the 3D printer toolhead and allows the optimized 3D part to be manufactured.

27 Claims, 11 Drawing Sheets

ND METHOD HAVING TOOLPATH ANALYSIS

ADDITIVE MANUFACTURING SYSTEM AND METHOD HAVING TOOLPATH ANALYSIS

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to additive manufacturing systems and methods, and more particularly to an additive manufacturing system and method that includes the ability to analyze a part to be made and to determine an optimum plurality of toolpaths to be used in creating the part to optimize one or more qualities or characteristics of the manufactured part.

BACKGROUND

The statements in this section merely provide background information related to the present disclosure and may not constitute prior art.

In an additive manufacturing system, sometimes referred to as a "3D printing" system, a viscous liquid ink composed of either a molten or curable material is extruded from a moving nozzle. This ink is laid down along a series of tool paths to form successive layers of a three dimensional part. The precise paths of the tool when laying down material to form a lower determines the features of the part being created. Once the material is laid down, it either solidifies as it cools (for molten inks), or is cured by the application of energy (often heat), either as the path is laid down, or after the part is completed (e.g., the "green" part can be placed in an oven to cure the ink).

New advances in chemistry and 3D printing now enable carbon fiber reinforced materials (CFRMs) to be additively manufactured, to make a 3D part. With CFRMs, both discontinuous (i.e., chopped fiber) and continuous fiber parts can be manufactured. In both cases, the reinforcing fibers are highly aligned as they are laid down, which results in a material that is strongly orthotropic. Because CFRMs are highly orthotropic, the toolpaths used in laying down the ink to print the materials will have a strong effect on their physical properties. For example, a simple square CFRM part will have very different properties depending on whether the toolpaths used to create it are predominantly vertical, horizontal, or spiraling.

Because the AM process allows toolpaths to be oriented differently at different positions (subject to physical limitations, e.g., the toolpaths have finite width and, within a given build layer, generally are not allowed to cross), it is possible to spatially vary the orthotropy of the part by controlling the toolpaths as the CFRM ink is laid down to form each layer of the part. This, at least in theory, allows for finished 3D parts having tailored or optimized structural characteristics. For example, the toolpaths could be selected to align fiber orientations to expected principal stresses at a given location, increasing part stiffness and strength or allowing reductions in weight.

Advanced optimization techniques, coupled with mechanical analysis methods such as finite element analysis, can determine optimal (relative to some figure of merit, such as stiffness or strength) fiber orientations at different locations of a 3D part. However, while various analytical or computational techniques for this optimization exist or are under development, they do not generally directly map to physically possible toolpaths that would need to be used in laying down the ink to form each layer of a complex 3D part, and may indeed result in desired orientations that are physically unachievable. In any instance where a 3D part is to be constructed which requires the use of something more complicated than simple part topologies with "uniform uniaxial alignment", it is not obvious how to create toolpaths to generate that 3D part with complex topology.

While a literature search does indicate some prior and ongoing work on orientation optimization, there is little regarding methods for reducing the "optimized" results to physically achievable toolpaths. There are a few relatively abstract mathematics papers on the challenges of developing such algorithms (or related algorithms, such as theorems addressing the mathematics of mowing lawns or plotting milling machine toolpaths), but no actual solutions to the problem at hand. For example, well known lawn mowing and milling machine algorithms are not applicable because in those cases, it is allowable to pass over the same region multiple times, but in an additive manufacturing application it is not.

One carbon fiber 3D printer is available from industry, from a company known as MarkForg3D. The software that accompanies purchase of this printer is proprietary and does include algorithms that plan (and execute) toolpaths to build up parts of specified geometries. However, the degree of control that this software provides is not sufficient for the problem at hand. Complex topologies are not possible, and spatially varying orientations within given layers are not allowed, beyond simple uniformly parallel or spiraling toolpaths.

Bramptom et al., the teachings of which are hereby incorporated by reference into the present disclosure, recently proposed a level set approach that attempts to address this challenge. Brampton et al. "New Optimization Method For Steered Fiber Composites Using The Level Set Method." *Structural and Multidisciplinary Optimization* 52.3 (2015): 493-505. However, even this approach does not result in physical attainable toolpaths; it necessarily leaves discontinuities, and from these discontinuities it is not clear how the toolpaths would be realizable in an actual additive manufacturing operation to make a 3D part. Furthermore, it does not address path connectivity, and thus results in thousands of unconnected paths and no indication of how to stitch them together. It is also not clear that a level set approach is sufficiently flexible to allow all relevant achievable topologies to be realized.

Therefore, there exists a need for a system and method which is able to take a set of desired orientations at various spatial locations, along with a 3D part topology, and generate a set of physically realizable toolpaths for 3D printing or other carbon fiber AM techniques.

SUMMARY

In one aspect the present disclosure relates to an additive manufacturing (AM) system for constructing a three dimensional (3D) part with controlled orthotrophy. The system may include a direct ink write 3D printing system and an electronic processor. The direct ink write 3D printing system is capable of printing ink loaded with reinforcing particles that produces orthotropic parts whose materials properties depend on the chosen printer toolpaths. The electronic processor is configured to take the part topology, load conditions, and design objective as inputs and generate a plurality of physically realizable toolpaths for a toolhead of the 3D printing system that yields a 3D part that optimally meets the design objective, that is physically achievable with the 3D printing system, and that minimizes a number of starts and stops necessary when constructing the 3D part.

In another aspect the present disclosure relates to a method for additively manufacturing (AM) a three dimensional (3D) part with controlled orthotrophy. The method may comprise using a direct ink write 3D printing system which prints printing ink loaded with reinforcing particles that produces orthotropic parts whose materials properties depend on the chosen printer toolpaths. The method may further comprise using an electronic processor configured to take the part topology, load conditions, and design objective as inputs and generate a plurality of physically realizable toolpaths for a toolhead of the 3D printing system that yields a 3D part that optimally meets the design objective, that is physically achievable with the 3D printing system, and that minimizes a number of starts and stops necessary when constructing the 3D part.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a high level diagram of one layer of an oblong part illustrating a number of guidepaths with optimal spatially varying orientations, that may be used as a starting point in determining optimized toolpaths for making that layer of the part;

FIG. 4 shows one subregion of the oblong part from FIG. 3, filled with propagated segment paths used to ultimately generate the toolpath;

FIG. 5 shows the segment paths in all the subregions assembled into the entire layer;

FIG. 6 shows the same segment paths from FIG. 5 but with sharp corners removed to accommodate physical limitations of the printing process; and FIG. 7 shows the segment paths from FIG. 6 joined together to create toolpaths, which have been created in accordance with the guidepaths shown in FIG. 3.

DETAILED DESCRIPTION

Figure 1:
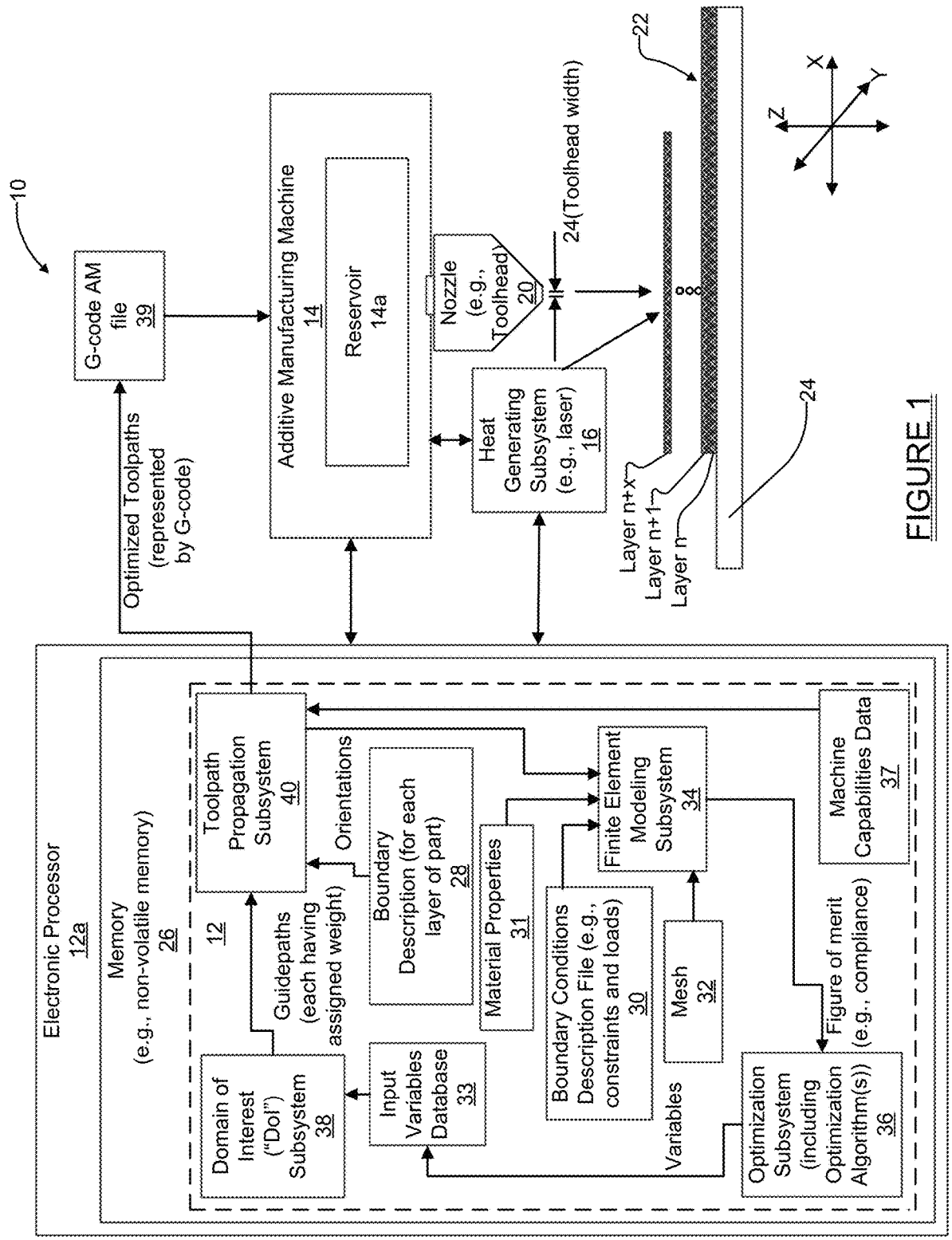
FIG. 1 is a high level view of one embodiment of a system in accordance with the present disclosure for creating a 3D additively manufactured part using an optimized toolpath subsystem.

The following description is merely exemplary in nature and is not intended to limit the present disclosure, application, or uses. It should be understood that throughout the drawings, corresponding reference numerals indicate like or corresponding parts and features.

The system and method of the present disclosure represents a significant advance in the art of 3D printing by its ability to take arbitrary guidepaths indicating desired, spatially varying orthotropy (i.e., material orientations) at various spatial locations on a part, and to generate physically achievable toolpaths that most closely approximate the desired material structure, which can be either translated to suitable code (e.g., G-code) that controls a print head being used in an AM process, or which can be mapped back to analysis codes to update the guidepaths for iterative design optimization. Thus, the physically realizable toolpaths generated by the system and method can be optimized, and, when an optimal solution is obtained, the resulting toolpaths can be used as-is to create a physical part that reflects the optimized configuration.

Referring to FIG. 1, there is a shown an additive manufacturing ("AM") system 10 in accordance with one embodiment of the present disclosure. The system 10 incorporates an electronic processor 12a which makes use of a toolpath generator 12. The toolpath generator 12 and software comprising other subsystems of the system 10, to be discussed in the following paragraphs, may be stored in a non-volatile memory 26 of the system 10. The toolpath generator 12 communicates with and controls an AM manufacturing machine 14 (hereinafter simply "AM machine"). The AM machine 14 is fed an ink comprised of an uncured thermoset polymer loaded with chopped carbon fibers from a reservoir 14a, and extrudes this ink through a nozzle 20 (which aligns the fibers in the direction of extrusion) onto a stage 22 or onto existing layers of the part that is being built up. The nozzle 20 has a width 24 that defines the width of a bead of raw material that is laid down, which corresponds to the width of the toolpath. Either the nozzle 20, the stage 22, or both may move in the X-Y plane during this extrusion process, which creates the layers of the manufactured part. After one layer has been completed, the nozzle 20 or the stage 22 is moved in the Z direction to begin a new layer. These motions are controlled by the electronic processor 12a and are defined by a G-code AM file 39 created by toolpath generator 12 residing in the memory 26. In some variants of the system 10, a heat or ultraviolet generating subsystem 16 may be used to rapidly cure or partly cure the ink as it is extruded; in other variants, the ink is rheologically self-supporting and the part is fully printed before it is cured, and then cured in an oven after the printing process.

The toolpath generator 12 may be stored in the non-volatile memory 26 and may include several distinct files or databases of information. The geometry of the part is described by information which may be termed a "mesh" 32, which describes an approximation of the part in terms of elements that can be analyzed using the finite element method. Along with this mesh 32 is corresponding information that may be termed a "boundary" description 28 that has the same topology as the mesh 32 but provides only the boundaries of the part (given as a list of X and Y coordinates) corresponding to each layer of the part. Another file/database is a boundary condition description 30 that contains boundary conditions for the part to be manufactured. The boundary conditions describe a set of constraints and loads for which the 3D part will be optimized, along with the definition of the quantity or figure of merit which will be used to determine the quality of the part. For example, if part stiffness is to be optimized, the boundary conditions may define attachment points and loads, and the figure of merit may be the resulting displacement in response to those loads. Another file/database 31 describes the properties of the material that will be printed and the capabilities of the machine itself (e.g., the material stiffness as a function of fiber/path orientation, the strength, the toolpath width, the minimum path turning radius, the layer thickness, etc.). An input variable database 33 stores a set of input variables that are used by a Domain of Interest (DoI) subsystem 38. These variables comprise the initial or current guess that is iteratively updated by the optimization subsystem 36.

The DoI subsystem 38 takes the set of input variables and uses them to generate a set of guidepaths describing how the desired part orthotropy varies in space. Various instantiations of the DoI subsystem are possible.

One variant, a streamline approach, might use a set of vectors at a set of X-Y points as the input variables, generate a set of streamlines from the resulting vector field, and use a set of generator points (either the same as the guide points or defined by additional input variables) to create guidepaths consistent with the streamlines. This variant is shown in FIG. 2E. In this variant, the input variable database 33 would include directions and a "flow strength" magnitude at a set of fixed guidepoints, and/or directions and flow strength magnitudes at and locations of a set of moveable guidepoints. In operation 202 these variables would be read from variable database 33, and at operation 204, a streamline generator (e.g., a commercial or open source flow solver) may generate a flow field from these velocity vectors. Next, at operation 206, individual streamlines may be generated from a set of generator points. These points could be additional points read in from variable database 33, a set of fixed points, or they could be identical to the generator points. These streamlines would be exported to the toolpath propagation subsystem 40 as guidepaths, as indicated at operation 208. The input variable database 33 may optionally include weights associated with each generator point, which would be the weights assigned to the resulting guidepaths.

Another variant of the DoI subsystem 38 might use level set function values on a fixed or variable grid as the input variables, and use the resulting level sets as the guidepaths. This variant is shown in FIG. 2F. In this variant, input variable database 33 would include level set function values at fixed grid points, and/or level set values and locations of moveable generator points. At operation 302, these values would be read in from the variable database 33, and at operation 304 they would be used to generate a corresponding level set function. At operation 306, some subset of this level set would be extracted and output to toolpath propagation subsystem 40 as guidepaths. In this approach, all guidepaths would have equal weights.

The guidepaths from the DoI subsystem 38 and the boundary description 28, along with the AM machine 14 capabilities data 37 (FIG. 1), are used by the toolpath propagation subsystem 40 to generate a set of physically realizable toolpaths. These toolpaths, along with the information stored in boundary conditions description file 30, material properties 31, and mesh 32 may be used as inputs to a finite element modeling subsystem 34. The finite element modeling subsystem 34 determines a figure of merit as defined in the boundary conditions description file 30. This figure of merit can be provided to an optimization subsystem 36 which includes one or more optimization algorithms. The optimization algorithm uses the figure of merit in updating the input database 33 that input to the DoI subsystem 38, and the process continues until an optimal set of toolpaths are realized. These toolpaths are then converted to G-code by the toolpath propagation subsystem 40 for use by the AM machine 14 in manufacturing the optimized part in a layer-by-layer fashion.

FIGS. 2a-2d show a high level flowchart 100 which sets forth various operations that the toolpath propagation subsystem 40 may implement in determining optimum toolpaths for making a 3D part. Initially at operation 101, a set of trial (i.e. initial) variables from input variable database 33 are given to the DoI subsystem 38. The DoI subsystem 38 uses these variables to produce a set of trial guidepaths for each layer which are loaded into the toolpath propagation subsystem 40 at operation 102. In one realization of this software, different weights may be associated with the different guidepaths and are read in at 104 from the variable database 33; otherwise, all guidepaths are weighted equally. At operation 106, the boundary description 28 is read, which contains boundaries defining a topology of the 3D part to be constructed. At operation 108, process specific parameters are read in from the machine capabilities data 37. These parameters may include, for example, the toolpath width, the minimum path turning radius, the layer thickness, etc.

Once all this input data has been read in, the actual toolpath calculation begins, layer by layer. At operation 109, development of toolpaths to fill the first layer of the part is begun. At operation 110, the guidepaths for a given layer are used to subdivide each layer of the 3D part into smaller subregions.

Each subregion is then independently filled with paths in the following manner. First, for each subregion, a "segment path" is created coincident with the sections of guidepath that form (some or all of) that subregion's boundaries. These segment paths inherit the weights of their generating guidepath.

Operation 112 propagates a segment path inwards, creating an unconnected "child" segment path parallel to its "parent" segment path, and spaced one physical toolpath width along the inner side of the parent. The child segment path inherits the weight of the parent segment path. As operation 112 is applied, the parent-child relationship of each segment path is stored. After each application of operation 112, operation 114 is applied, which checks to see if the newly generated segment path intersects any of the existing segment paths. If so, the intersecting segment paths are merged into a new segment path (with the average weight of its parents) and the parent-child relationship data is updated appropriately.

Figure 2A:
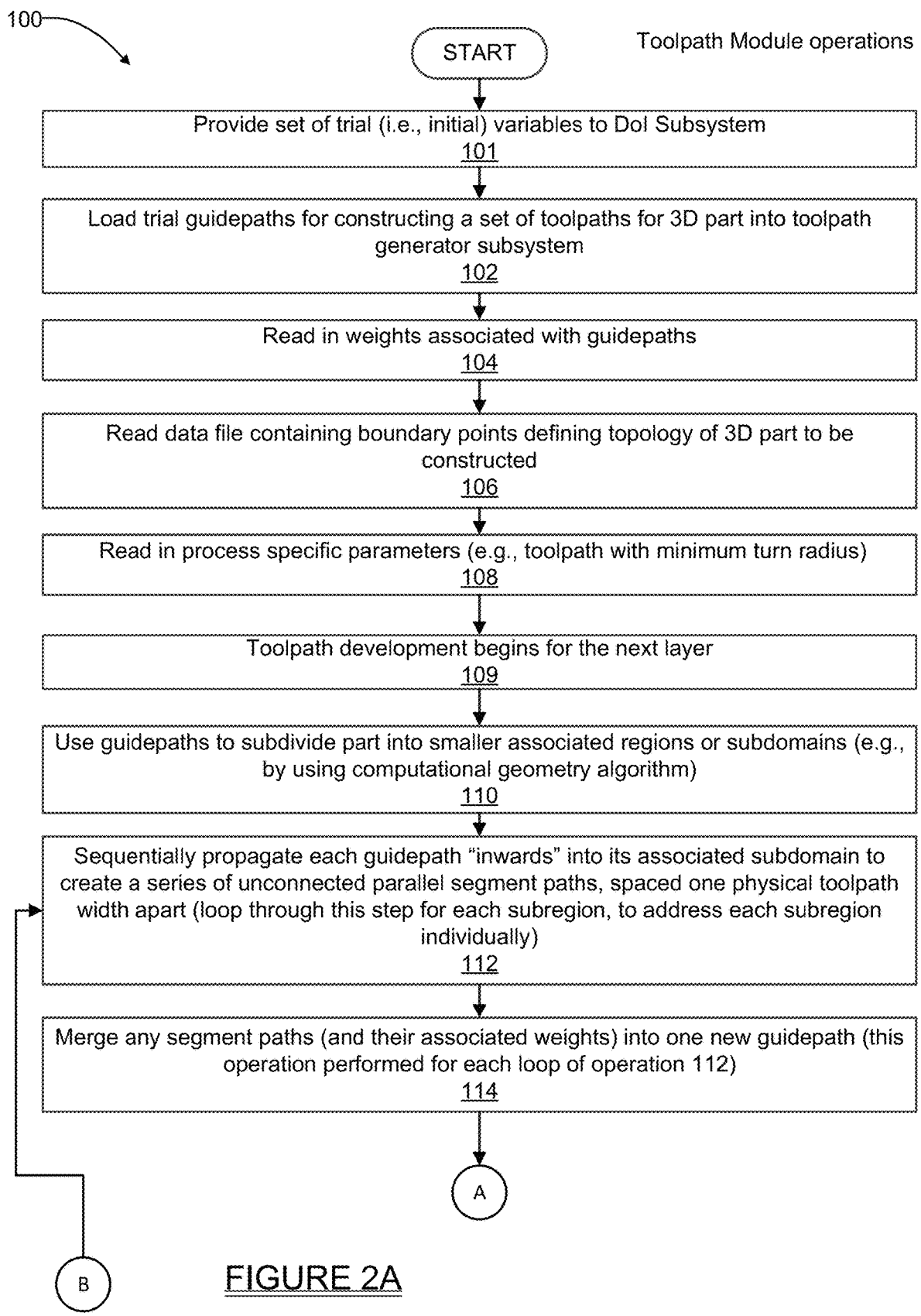
FIGS. 2A through 2D illustrate a high level flowchart illustrating operations performed in analyzing all of the possible tool guidepaths and optimizing the guidepaths to minimize the number of independent guidepaths in a manner that optimizes construction of the part, taking into consideration its geometry and structural requirements.
Figure 2B:
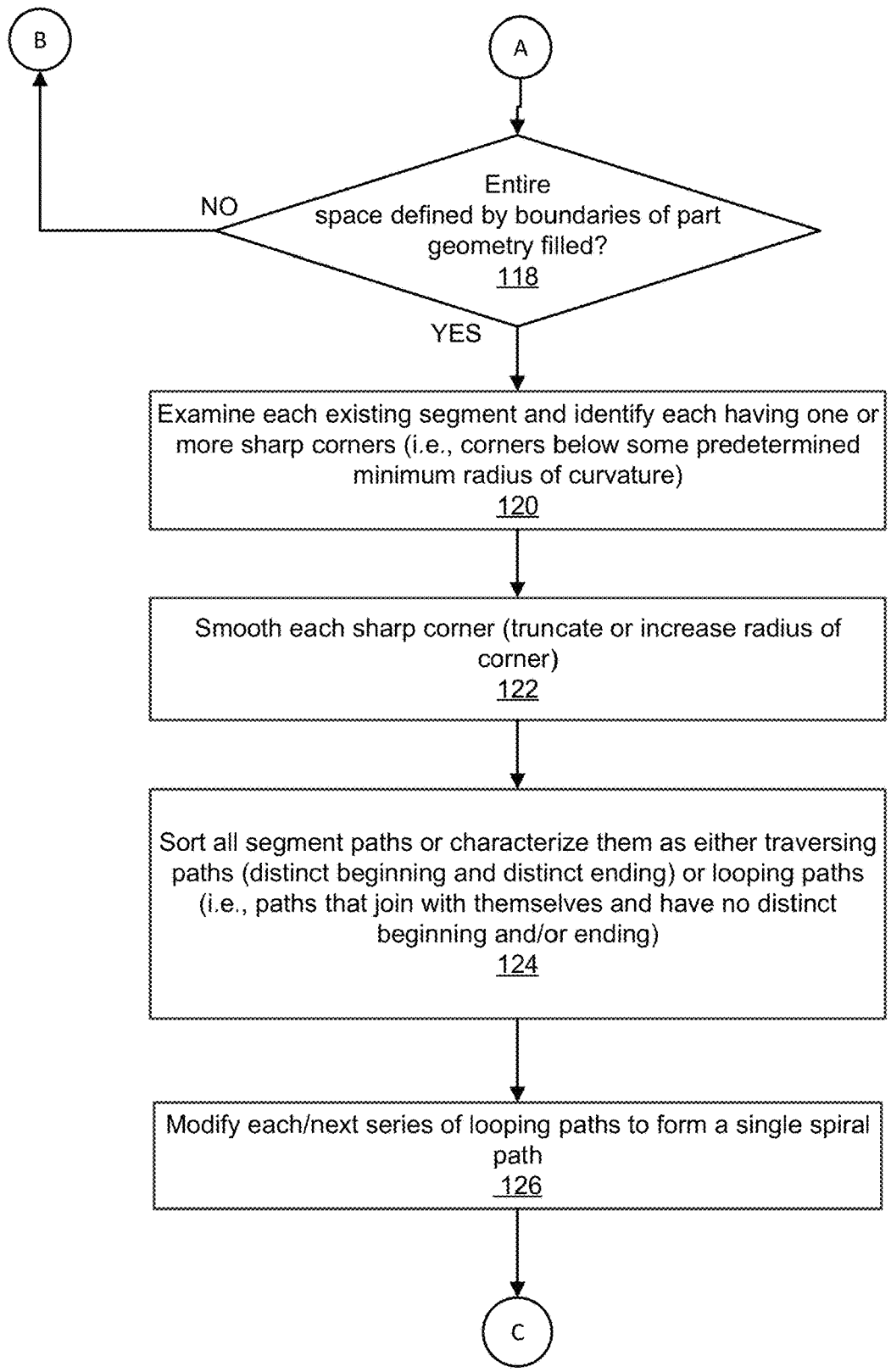

In FIG. 2B at operation 118 a check is made to determine if the entire subregion has been filled. If not, operations 112 and 114 are repeated. If all weights are equal, operations 112 and 114 are applied sequentially in turn to the childless segment paths in a subregion, causing all of the original guidepaths to have equal influence on the paths in the subregion. Otherwise, operations 112 and 114 are applied more frequently to the more heavily weighted segment paths and their children, causing the more heavily weighted original guidepaths to have a greater influence on the paths in the subregion.

Once the check at 118 indicates that the entire subregion has been filled, then the entire sequence of operations 112, 114, and 118 is repeated for the next subregion.

Once all subregions are filled with segment paths, at operation 120, every segment path is examined and all sharp corners are identified. By "sharp" corners it is meant sequences of segments with lengths and included angles such that the path changes direction more sharply than the machine is capable of (the AM machine's toolhead 20 has a certain minimum radius of curvature with which a bead of material can be laid down). At operation 122, each sharp corner is smoothed (e.g., by truncating or deleting the segments creating the sharp corner and connecting the paths with segments that are consistent with the allowable machine radius of curvature).

Figure 2C:
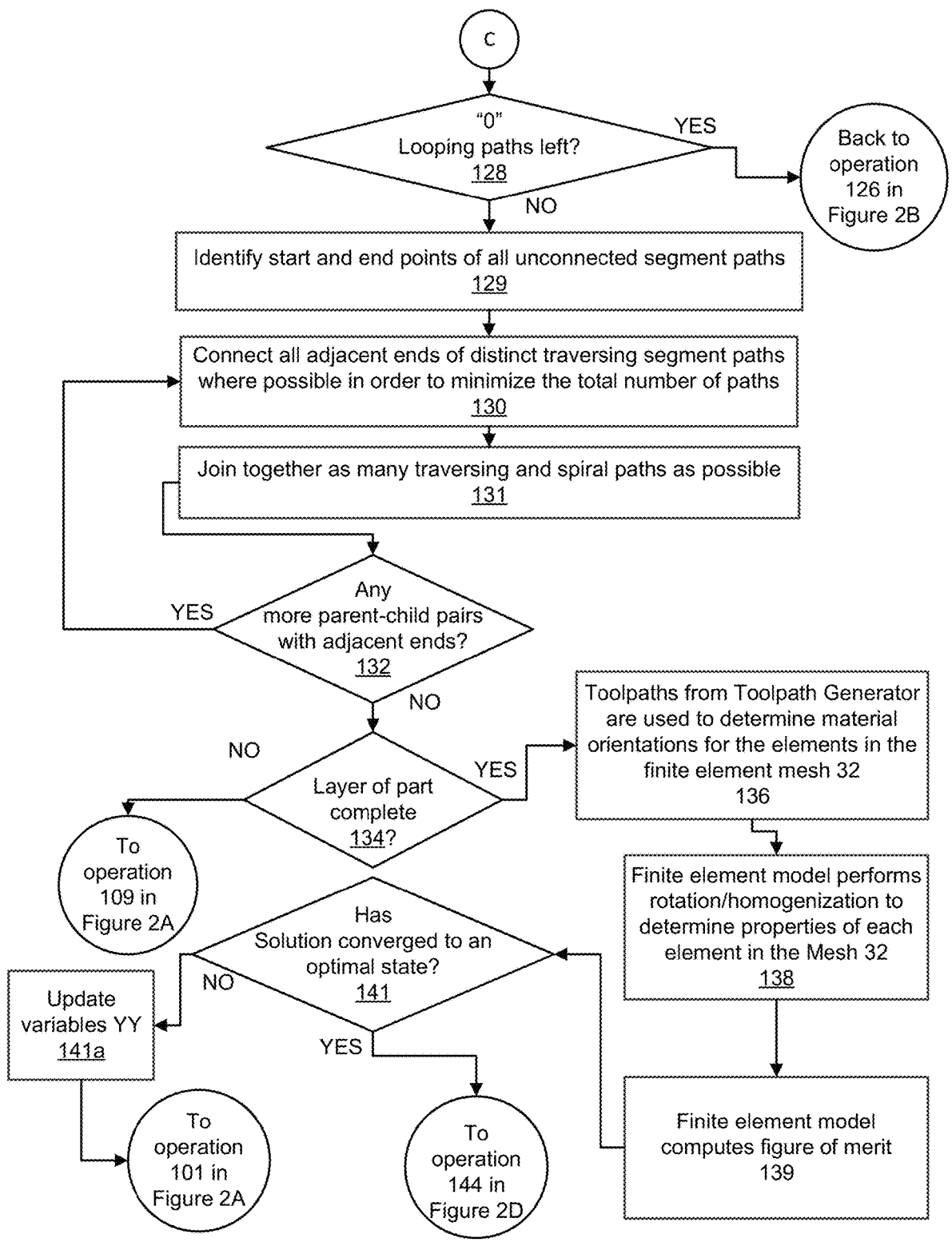
Figure 2D:
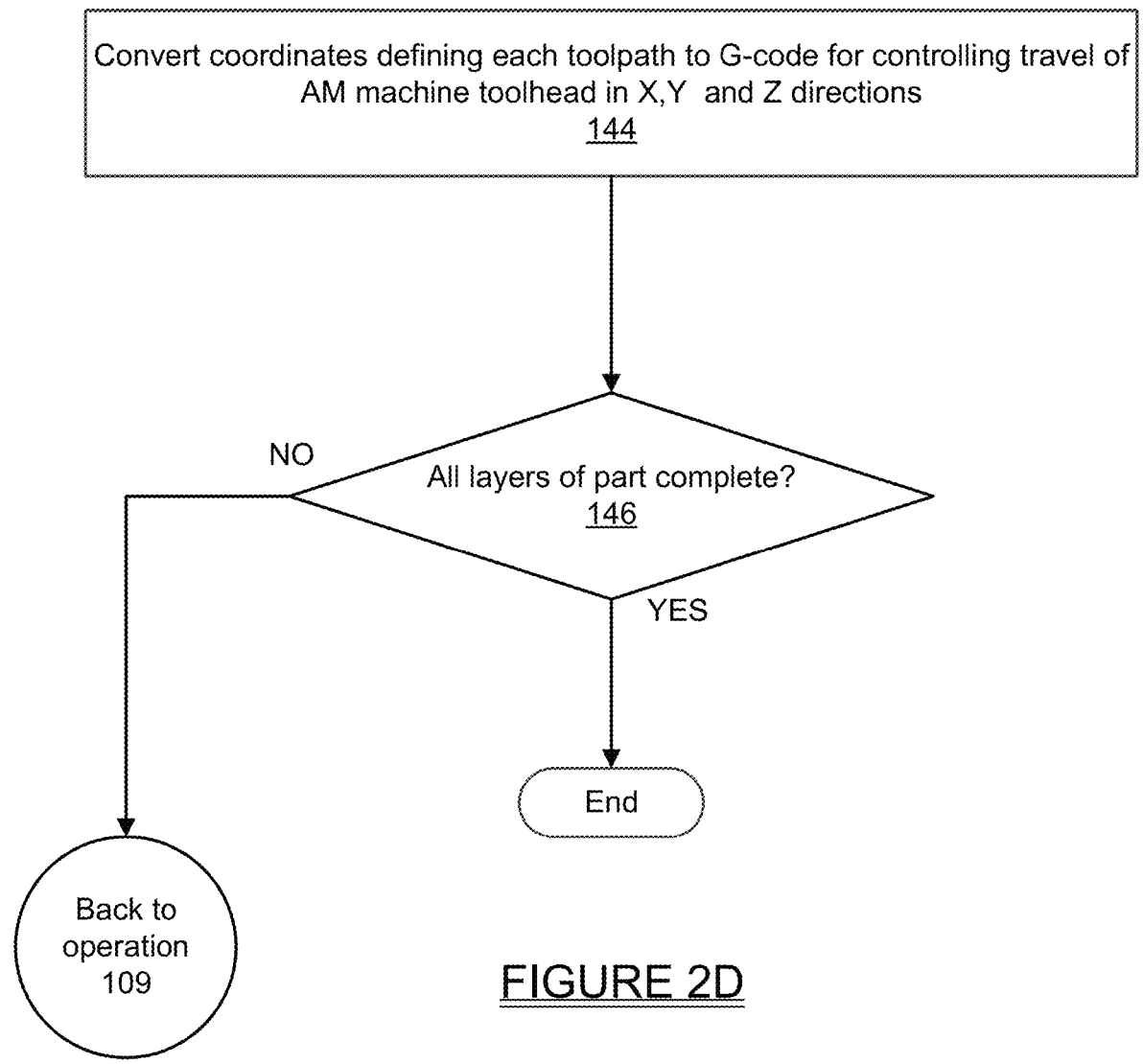
Figure 2E:
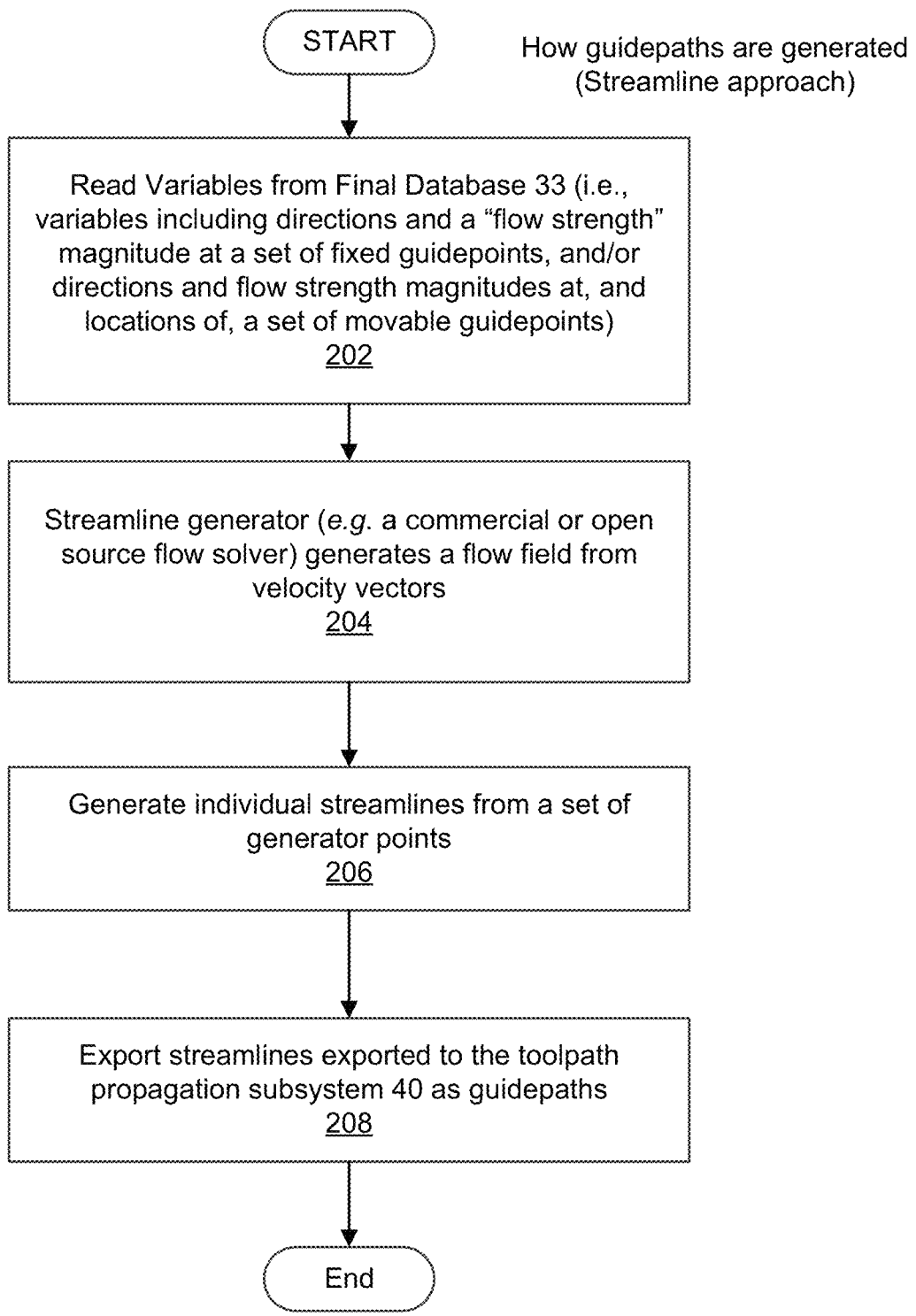
FIG. 2E is a high level flowchart illustrating major operations showing how guidepaths may be constructed using a streamline approach.
Figure 2F:
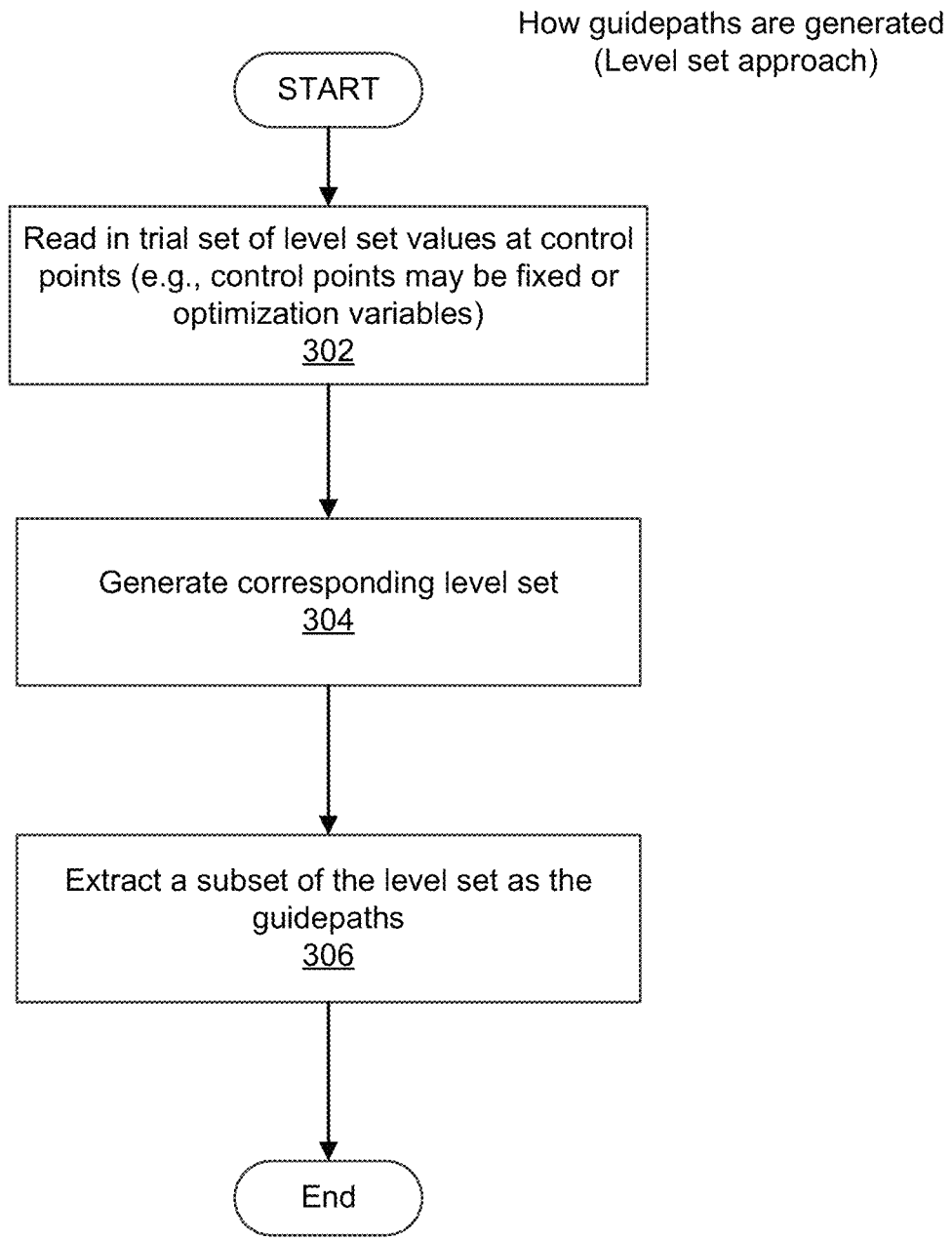
FIG. 2F is a high level flowchart illustrating major operations showing how guidepaths may be generated using a level set approach.

Since direct ink write processes can produce poor quality material when a bead is started or stopped, it is desirable to minimize the number of toolpath end points in a layer and to print the part with the smallest number of continuous paths as possible. Therefore, the toolpath propagation subsystem 40 next attempts to connect as many of the unconnected paths as possible. At operation 124, the segment paths are sorted or characterized as either "traversing paths" (i.e., with distinct beginning and distinct ending) or looping paths (i.e., paths that join with themselves and have no distinct beginning and/or ending). At operation 126 the method may modify each/next series of looping paths to form a single spiral path. Referring to FIG. 2C, at operation 128 an inquiry is made to determine if there are zero looping paths left. If the answer to this inquiry is "Yes", then operation 126 is repeated. If the answer is "No", then at operation 129 the method may identify the start and end points of all unconnected segment paths. At operation 130, the method may then connect all adjacent ends of distinct traversing segment paths where possible in order to minimize the total number of paths.

Next, operation 131 is applied, which attempts to join together as many of the traversing and spiral paths as possible. A given path is selected. If it has an end that is adjacent to the end of either its parent or child, a segment is created between the adjacent ends and the two paths are joined together into one longer path. A check at operation 132 is then made for any more parent-child pairs with adjacent ends, and if so operations 130 and 131 are repeated until no more parent-child pairs with adjacent ends can be found. If the check at operation 134 indicates that the layer of the part is complete, then the toolpath propagation subsystem 40 goes back to operation 109 and proceeds to the next layer, dividing it into subregions, propagating segment paths to fill it, eliminating all sharp corners, changing loop hierarchies into spirals, and jointing adjacent paths. This continues until every layer is complete.

At operation 136, the toolpaths from the toolpath propagation subsystem 40 are used to determine the material orientation for the elements in the finite element mesh 32. For every element of every layer, the toolpath that passes closest to its centroid is identified and the orientation of the toolpath at the closest point is output to the finite element model 34.

At operation 138, using the material orientations from operation 136 and the material properties from the material properties file 31, the finite element model 34 performs a rotation/homogenization to determine the properties of each element in the mesh 32. Then, at operation 139, using these material properties, the boundary conditions 30, and the mesh 32, the finite element model 34 solves the physics problem and computes the appropriate figure of merit resulting from the variables in the input variable database 33 and the corresponding toolpaths. This figure of merit is output to the optimization subsystem 36.

At operation 141, the optimization subsystem 36 performs a check to determine if the solution has converged sufficiently to an optimal state. If it has not, the variables in the input variable database 33 are updated according to the optimization algorithm in the optimization subsystem 36. Various nonlinear multidimensional optimization schemes for performing the convergence check and updating the variables are possible, including the Nedler-Mead "downhill simplex" algorithm, various gradient-based algorithms, or even genetic algorithms. If convergence has not been achieved, the variables are updated and the toolpath generating software 12 inputs the new variables back into the DoI subsystem and begins again from operation 101 of FIG. 2A.

Once convergence has been achieved, the toolpath generator 12 executes operation 144, which converts the toolpaths to G-code capable of controlling the AM machine 14 toolhead 20 in the X, Y, and Z directions. The resulting G-code file 39 can be used to by the AM machine 14 to print the optimized part.

Figure 3:
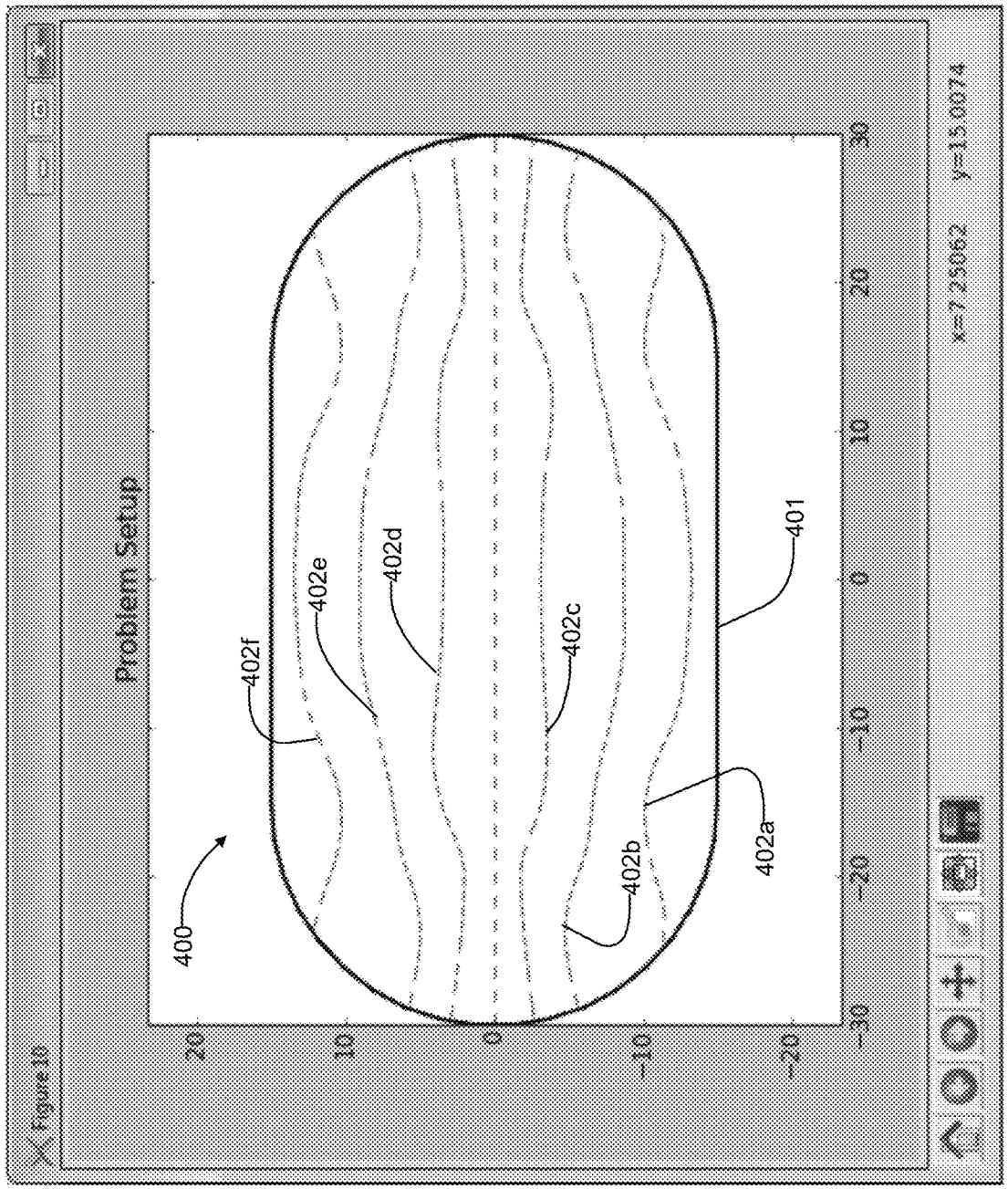
FIGS. 3-7 illustrate highly significant steps that the toolpath generation algorithm executes in deriving physically achievable optimized toolpaths for a layer of a part.

FIGS. 3 through 7 illustrates an example of one layer of a part 400 for which toolpaths are generated by the toolpath propagation subsystem 40. FIG. 3 shows the part boundary from the Part Geometry Description file 28 as a solid black line 401, with dashed green lines 402a-402f indicating the guidepaths from the DoI subsystem 38 for one particular set of input variables YY. In this particular case, the dashed lines 402a-402f were generated by a level set method and all have equal weights. These guidepaths are used as a starting point in determining manufacturable toolpaths.

Figure 4:
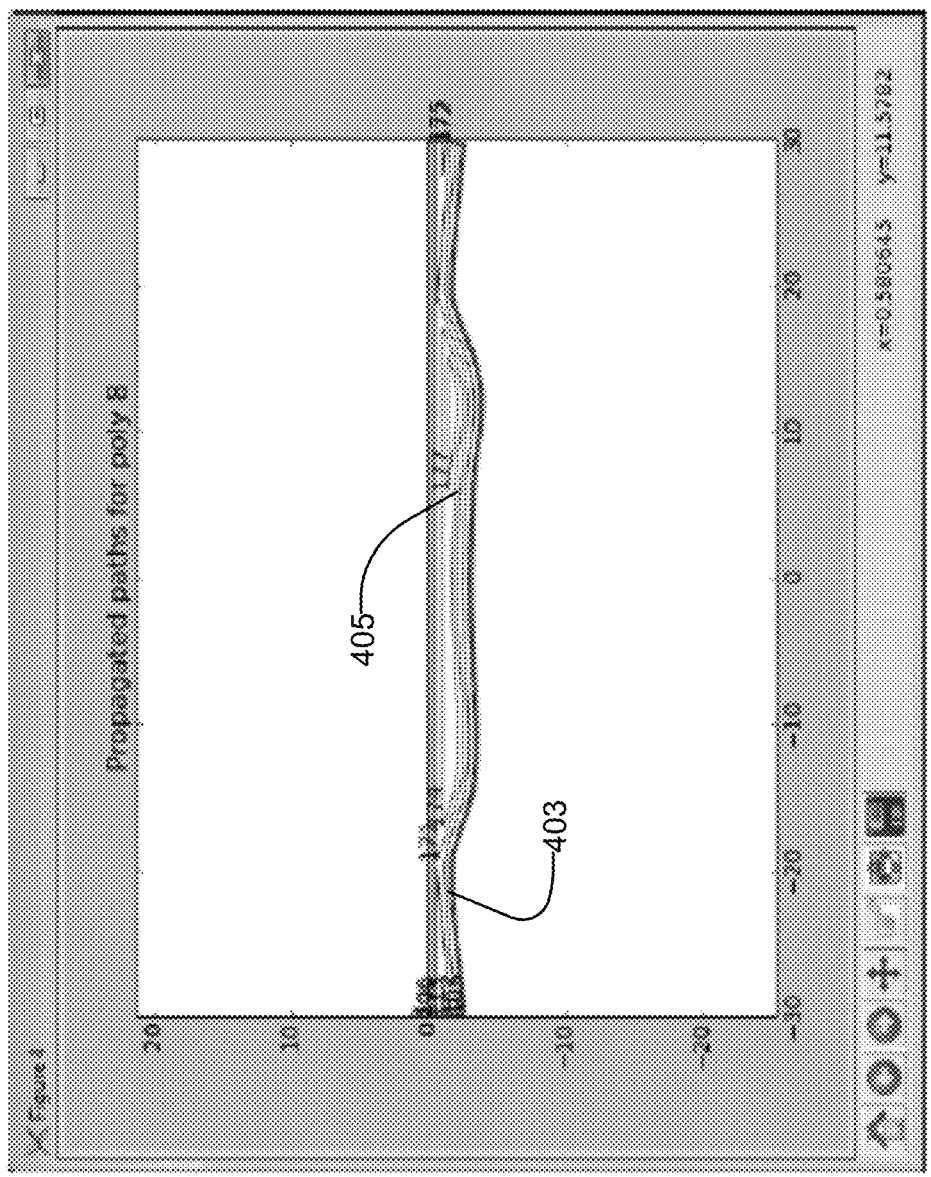
Figure 6:
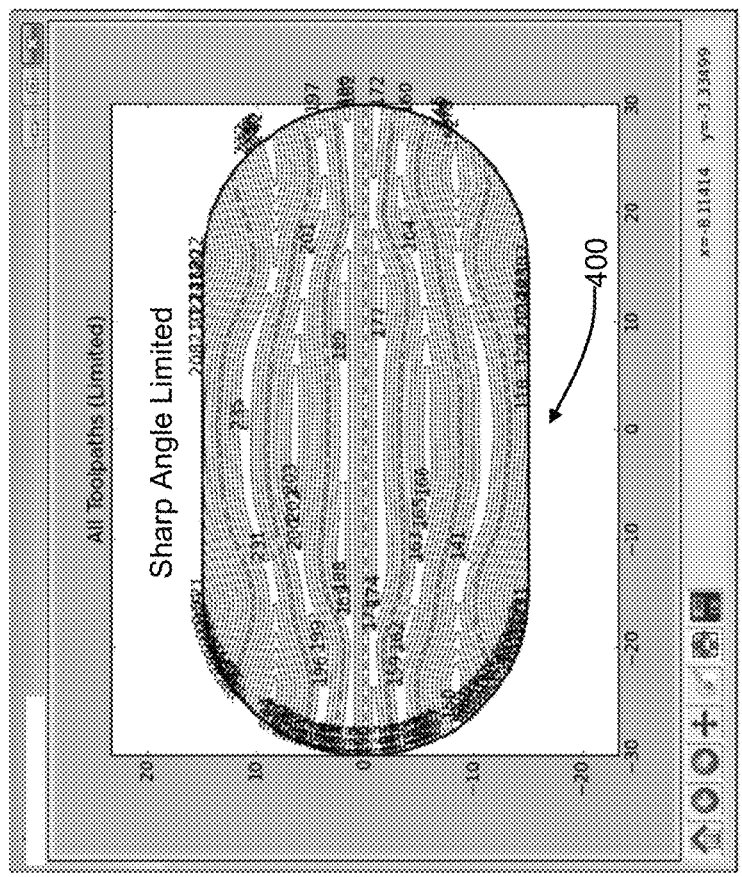
Figure 5:
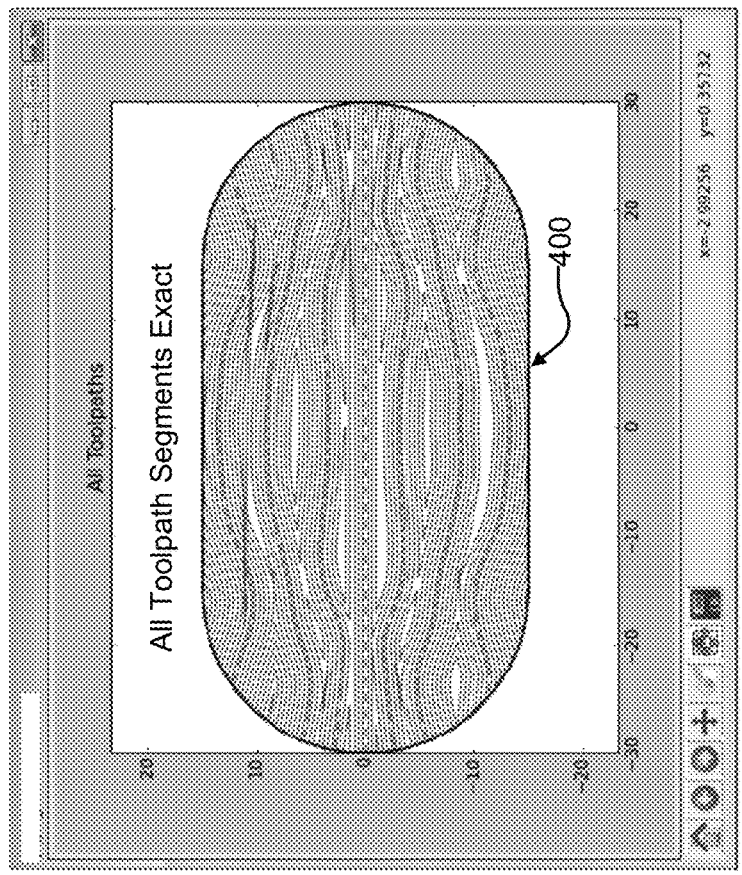
Figure 7:
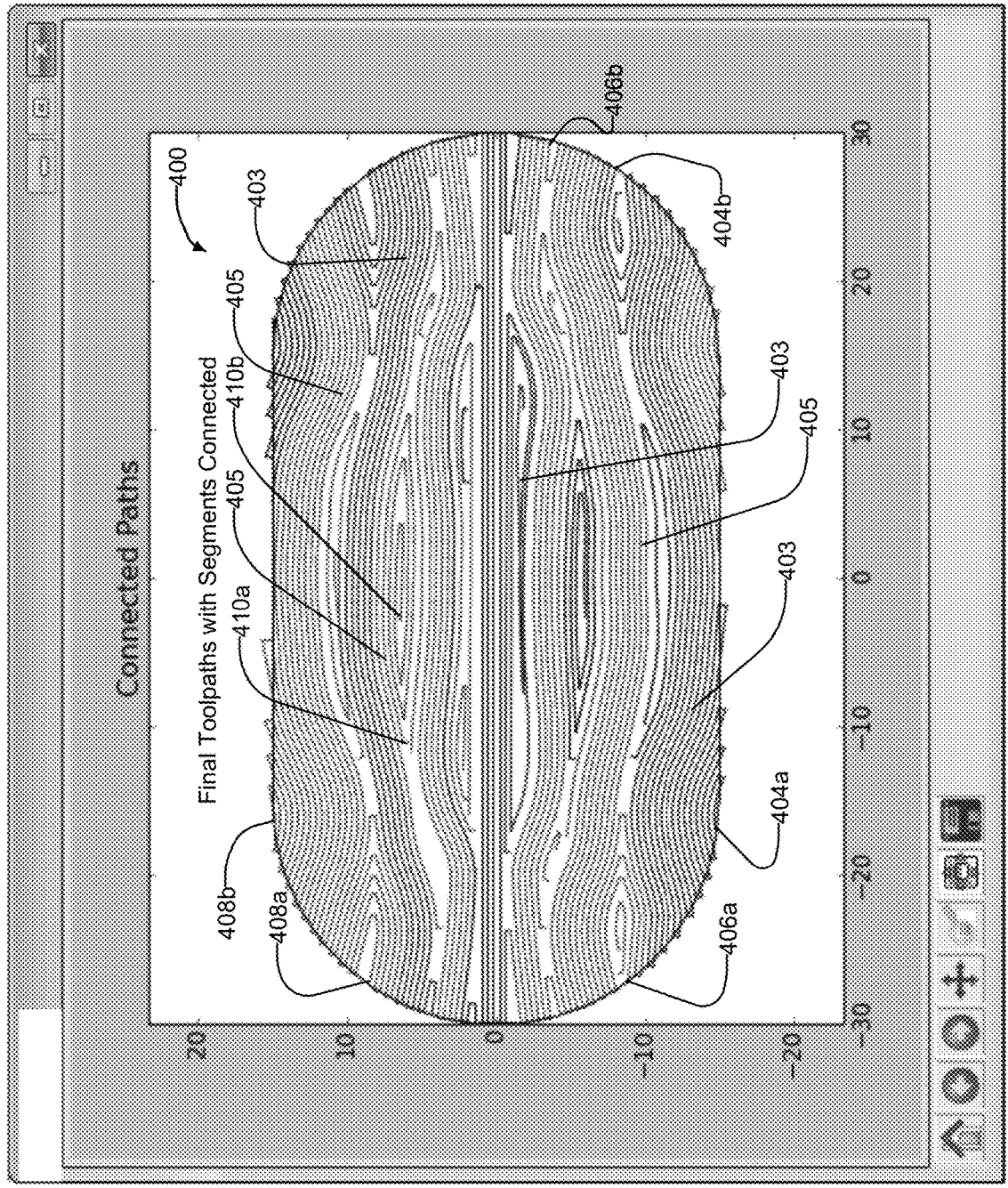

These guidepaths subdivide the layer into subregions shown in FIG. 3. In FIG. 4, the guidepaths have been propagated inwards in one of these subregions to create families of segment paths. Traversing segment paths are shown in blue (i.e., paths 403 of FIGS. 4 and 7), while looping segment paths are shown in red (paths 405 of FIGS. 4 and 7). These segment paths still have sharp corners and have not yet been joined together into toolpaths. FIG. 5 shows the segment paths in all the subregions assembled into the entire layer 400, and FIG. 6 shows the same segment paths with sharp corners removed. Finally, FIG. 7 shows the layer 400 after the looping segment paths have been converted to spirals and all the segment paths joined into as small a number of toolpaths as possible. Different toolpaths are shown in different colors. The influence of the generating guidepaths is evident. For example, the blue path (lowermost region 403 in the FIG. 7) between two end points 404a and 404b define a continuous traversing toolpath with a plurality of parallel segment portions generally in accordance with guidepath 402a in FIG. 3 (although it is also in places influenced by guidepath 402b). The two end points 410a and 410b illustrate a spiral toolpath that originated from a series of looping segment paths.

The present disclosure thus provides a system and method for developing optimized toolhead toolpaths for carbon fiber direct ink write (DIW) additive manufacturing processes which result in desired, spatially varying material orientations. An important consideration with the present disclosure to this is the method by which a set of variables upon which an optimization routine can operate are transformed into a set of physically achievable (i.e., realizable) toolpaths that can either be translated to suitable code (e.g., G-code) that controls the AM DIW machine, or that can be mapped back into a finite element analysis code to allow a figure of merit to be calculated and enable further iterative design optimizations.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An additive manufacturing (AM) system for constructing a three dimensional (3D) part with controlled orthotrophy, comprising:
    a direct ink write 3D printing system which prints printing ink loaded with reinforcing particles to produce orthotropic parts whose materials properties depend on chosen printer toolpaths, and
    an electronic processor configured to take a part topology, load conditions, and design objective as inputs and generate a plurality of physically realizable toolpaths for a toolhead of the 3D printing system that yields a 3D part that optimally meets the design objective, that is physically achievable with the 3D printing system, and that minimizes a number of starts and stops necessary when constructing the 3D part;
    wherein the electronic processor further includes a finite element modeling subsystem that receives load conditions on the 3D part and a plurality of toolpaths, and that utilizes a mesh describing the part topology to generate a figure of merit; and
    wherein the figure of merit is further used by the electronic processor to help produce an updated set of inputs which even better meet the design objective, for further use by the finite element modeling subsystem in performing another computation of physically realizable toolpaths.

2. The system of claim 1, wherein the electronic processor further includes a domain of interest (DoI) subsystem that receives a description of the part topology, including part boundaries, and a mathematical representation of a desired part orthotropy expressed with a finite number of mathematical variables, and generates a plurality of guide paths that describe spatially varying orthotropy at different locations.

3. The system of claim 1, wherein the electronic processor further includes a toolpath generation subsystem that receives a description of the part topology including boundaries of the part, a description of the physical capabilities of the 3D printing system, and a plurality of guide paths that describe spatially varying orthotropy at different locations, and generates a plurality of toolpaths that describe how the 3D printing system should move the tool head to build each layer of the 3D part.

4. The system of claim 1, wherein the electronic processor utilizes the mesh describing the part topology to:
    compute the material orthotropy in each element of the mesh that is consistent with the toolpaths;
    determine appropriate homogenized material properties in each element based on a computed orthotropy and characteristics of the ink and the 3D printing system, and
    solve a resulting boundary value problem to compute the figure of merit relative to the design objective.

5. The system of claim 1, wherein the electronic processor further includes an optimization subsystem that uses the figure of merit associated with a current mathematical representation of a desired part orthotropy to update a mathematic representation of a desired part orthotropy to further improve the 3D part relative to the design objective; and
    wherein the optimization subsystem additionally includes convergence criteria that provide an indication of when a solution sufficiently close to optimal has been achieved.

6. The system of claim 2, wherein the electronic processor includes a domain of interest (DoI) subsystem, and wherein the DoI subsystem generates a plurality of guidepaths using a streamline approach, wherein the DoI subsystem uses a set of vectors at a set of X-Y points as input variables, generates a set of streamlines from a resulting vector field, and then uses a set of generator points to create the guidepaths; and
    wherein a mathematical description of a desired part orthotropy is comprised of x-y positions at which vectors are defined, the vectors themselves, and the x-y positions of generator points, for each layer of the 3D part.

7. The system of claim 6, wherein the mathematical description of a desired part orthotropy additionally includes weights associated with each generating point, and therefore, with each resulting guidepath, which allows the desired orthotropy in a vicinity of certain features to have greater influence on a final version of the 3D part.

8. The system of claim 6, wherein the DoI subsystem generates the plurality of guidepaths using a level-set approach, wherein the DoI subsystem uses a set of x-y points at which values of a level set function are defined, and uses the resulting level sets as guidepaths; and
    wherein the mathematical description of the desired part orthotropy is comprised of the x-y positions at which the level set function is defined, scalar values of the level set function at that point, and level set spacings.

9. The system of claim 8, wherein the level set function is defined at variable locations instead of or in addition to locations on a fixed grid, which allows finer control of part orthotropy around features of interest including at least one of holes, attachment points, and stress concentrating features.

10. The system of claim 5, wherein the electronic processor further includes a DoI subsystem, a toolpath generator subsystem, a finite element modeling subsystem, and an wherein the optimization subsystem, which form a closed loop system.

11. The system of claim 3, wherein the toolpath generation subsystem further converts the optimized toolpaths to a selected code for controlling the toolhead of the AM system.

12. The system of claim 11, wherein the selected code comprises G-code.

13. The system of claim 3, wherein the toolpath generation subsystem uses the guidepaths to subdivide each layer of the part to be manufactured into subregions.

14. The system of claim 13, wherein the toolpath generation subsystem creates initial parent segment paths coincident with the sections of guidepath that form at least a portion of a specific subregion's boundaries.

15. The system of claim 14, wherein the toolpath generation subsystem propagates the parent segment paths inwards to create new unconnected child segment paths parallel to the parent segment paths and spaced one toolpath width along a side of the parent segment paths.

16. The system of claim 15, wherein each of the new unconnected child segment paths inherits weights of its respective said parent segment path.

17. The system of claim 16, wherein the toolpath generation subsystem checks to see if the new unconnected child segment path intersects any previously generated segment path, and when the intersection occurs, generates a new segment path replacing the intersecting segment paths and having an average weight of parents of each of unconnected child segment and the previously generated segment path.

18. The system of claim 17, wherein the toolpath generation subsystem propagates parent segment paths to form new child segment paths preferentially by the path weights, so that descendant segment paths, including at least one of children and grandchildren of guidepaths with high weights are more numerous than descendant segment paths of guidepaths with lower weights.

19. The system of claim 18, wherein the toolpath generation subsystem identifies corners of the segment paths which are too sharp for the AM system toolhead to follow, and truncates and/or smooths these sharp corners to the point where they can be followed by the toolhead.

20. The system of claim 19, wherein the toolpath generation subsystem identifies segment paths that form closed loops, as opposed to traversing paths that extend from one boundary to another, and then breaks these loops and connects parents and children to create connected spiraling toolpaths.

21. The system of claim 20, wherein the toolpath generation subsystem connects, as many of remaining unconnected segment paths as possible within a given layer, by connecting nearby endpoints of parent-children pairs, in order to minimize starts and stops of the AM system while manufacturing a part, which is then repeated for each layer of the 3D part.

22. The system of claim 3, wherein the toolpath generation subsystem creates unconnected segment paths using a mast marching method to propagate each guidepath outwards, with marching velocities defined by a guidepath weight, thereby filling up a layer.

23. The system of claim 22, wherein the toolpath generation subsystem identifies corners of the segment paths which are too sharp for the AM system toolhead to follow, and at least one of truncates or smooths sharp corners sufficiently to enable the sharp corners to be followed by the toolhead.

24. The system claim 23, wherein the toolpath generation subsystem identifies segment paths that form closed loops, as opposed to traversing paths that extend from one boundary to another, and then breaks the closed loops and connects parents and children to create connected spiraling toolpaths.

25. The system of claim 24, wherein the toolpath generation subsystem connects, as many of remaining unconnected segment paths as possible within a given layer of the 3D part, by connecting nearby endpoints of parent-children pairs, in order to minimize starts and stops of the AM system while manufacturing the 3D part, and then repeats for each layer.

26. A method for additively manufacturing (AM) a three dimensional (3D) part with controlled orthotrophy, the method comprising:
using a direct ink write 3D printing system which prints printing ink loaded with reinforcing particles that produces orthotropic parts whose materials properties depend on chosen printer toolpaths,
using an electronic processor and a finite element modeling subsystem, wherein the electronic processor is configured to take a part topology, load conditions, and a design objective as inputs and generate a plurality of physically realizable toolpaths for a toolhead of the 3D printing system that yields a 3D part that optimally meets the design objective, which is physically achievable with the 3D printing system, and which minimizes a number of starts and stops necessary when constructing the 3D part;
using the finite element modeling subsystem to receive load conditions on the 3D part and a plurality of toolpaths, and that utilizes a mesh describing the part topology to generate a figure of merit; and
wherein the figure of merit is further used by the electronic processor to help produce an updated set of inputs which even better meet the design objective, for further use by the finite element modeling subsystem in performing another computation of physically realizable toolpaths.

27. An additive manufacturing (AM) system for constructing a three dimensional (3D) part with controlled orthotrophy, comprising:
a direct ink write 3D printing system which prints printing ink loaded with reinforcing particles to produce orthotropic parts whose materials properties depend on chosen printer toolpaths, and
an electronic processor configured to take a part topology, load conditions, and design objective as inputs and generate a plurality of physically realizable toolpaths for a toolhead of the 3D printing system that yields a 3D part that optimally meets the design objective, that is physically achievable with the 3D printing system, and that minimizes a number of starts and stops necessary when constructing the 3D part;
wherein the electronic processor further includes a finite element modeling subsystem that receives load conditions on the 3D part and a plurality of toolpaths, and that utilizes a mesh describing the part topology to generate a figure of merit;
wherein the figure of merit is further used by the electronic processor to help produce an updated set of inputs which even better meet the design objection, for further use by the finite element modeling subsystem in performing another computation of physically realizable toolpaths; and
wherein the electronic processor further includes a finite element modeling subsystem that receives load conditions on the 3D part and a plurality of toolpaths, and that utilizes a mesh describing the part topology to:
compute the material orthotropy in each element of the mesh that is consistent with the toolpaths;
determine appropriate homogenized material properties in each element based on the computed orthotropy and characteristics of the ink and the 3D printing system; and
solve a resulting boundary value problem to compute a figure of merit relative to the design objective.

* * * * *